(12) United States Patent
de Bree

(10) Patent No.: US 8,291,992 B2
(45) Date of Patent: Oct. 23, 2012

(54) SOIL WORKING DEVICE

(75) Inventor: Cornelius Hermanus Maria de Bree, Driebergen (NL)

(73) Assignee: Redexim Handel-En Exploitatie Maatschappij B.V., Zeist (NL)

( * ) Notice: Subject to any disclaimer, the term of this patent is extended or adjusted under 35 U.S.C. 154(b) by 0 days.

(21) Appl. No.: 13/177,418

(22) Filed: Jul. 6, 2011

(65) Prior Publication Data
US 2012/0012351 A1  Jan. 19, 2012

Related U.S. Application Data

(62) Division of application No. 12/073,478, filed on Mar. 6, 2008, now abandoned.

(30) Foreign Application Priority Data

Mar. 6, 2007 (EP) ..................................... 07103568
Apr. 24, 2007 (EP) ..................................... 07106825

(51) Int. Cl.
*A01B 45/02* (2006.01)
(52) U.S. Cl. ................................ 172/21; 172/94; 172/96
(58) Field of Classification Search .................... 172/21, 172/22, 94, 95, 91, 92, 93, 96, 97
See application file for complete search history.

(56) References Cited

U.S. PATENT DOCUMENTS

| | | | |
|---|---|---|---|
| 1,871,529 A | 8/1932 | Karshner | |
| 2,068,828 A | 1/1937 | Tustain | |
| 2,255,040 A | 9/1941 | Helbig | |
| 2,730,028 A | 1/1956 | Oswalt | |
| 2,800,066 A | 7/1957 | Cohrs et al. | |

(Continued)

FOREIGN PATENT DOCUMENTS

EP  0 037 595  10/1981

(Continued)

OTHER PUBLICATIONS

U.S. Appl. No. 12/073,478—Election Restriction dated Nov. 13, 2009.

(Continued)

*Primary Examiner* — Jamie L McGowan
(74) *Attorney, Agent, or Firm* — Miles & Stockbridge P.C.; David R. Schaffer, Esq.

(57) ABSTRACT

In a mobile soil working device comprising a machine frame (23), a drive for at least one penetration tool (3) adapted for up and down movement, the penetration tool (3) being adapted to be driven into the soil and to be pulled out again, a guide element (4) for at least one penetration tool (3), the guide element being guided movably at the machine frame (23), a tool holder (2) for the penetration tool (3), which is supported for pivotal movement about a first pivot axis (40) in the guide element (4) movable up and down by the drive, so as to allow a pivoting of the penetration tool (3) against a spring force while the tool is in the soil, it is provided that, between the tool holder (2) and the guide element (4), a torsion element (1a, 1b, 1c) is provided coaxially with the first pivot axis (40), which torsion element, under a force effect on the at least one penetration tool (3), allows the tool holder (2) to pivot relative to the guide element (4) and, when the force effect ceases, exerts a restoring moment on the tool holder (2) so that the penetration tool (3) pivots back to the home position after having been pulled from the soil.

18 Claims, 9 Drawing Sheets

U.S. PATENT DOCUMENTS

| | | | |
|---|---|---|---|
| 3,461,973 A | 8/1969 | Geurts | |
| 3,490,540 A | 1/1970 | West et al. | |
| 3,586,109 A | 6/1971 | Eversole et al. | |
| 3,834,464 A | 9/1974 | Carlson et al. | |
| 4,422,510 A * | 12/1983 | de Ridder | 172/21 |
| 4,632,189 A | 12/1986 | Rizzo | |
| 4,658,909 A | 4/1987 | McDermott et al. | |
| 5,709,272 A | 1/1998 | Jones et al. | |
| 5,797,458 A * | 8/1998 | Simon et al. | 172/2 |
| 5,810,092 A | 9/1998 | Selvatici | |
| 5,988,290 A * | 11/1999 | Banks | 172/21 |
| 6,003,613 A | 12/1999 | Reincke | |
| 6,041,869 A | 3/2000 | Lewis et al. | |
| 6,454,019 B1 | 9/2002 | Prairie et al. | |
| 6,561,282 B2 | 5/2003 | Smith | |
| 7,472,759 B2 * | 1/2009 | Petersen | 172/22 |
| 7,730,960 B1 | 6/2010 | Knight et al. | |
| 2002/0056554 A1 * | 5/2002 | Hargreaves et al. | 172/21 |

FOREIGN PATENT DOCUMENTS

JP 55-089538 7/1980

OTHER PUBLICATIONS

U.S. Appl. No. 12/073,478—Non-Final Office Action dated Aug. 4, 2010.

U.S. Appl. No. 12/073,478—Final Office Action dated Jan. 6, 2011.

* cited by examiner

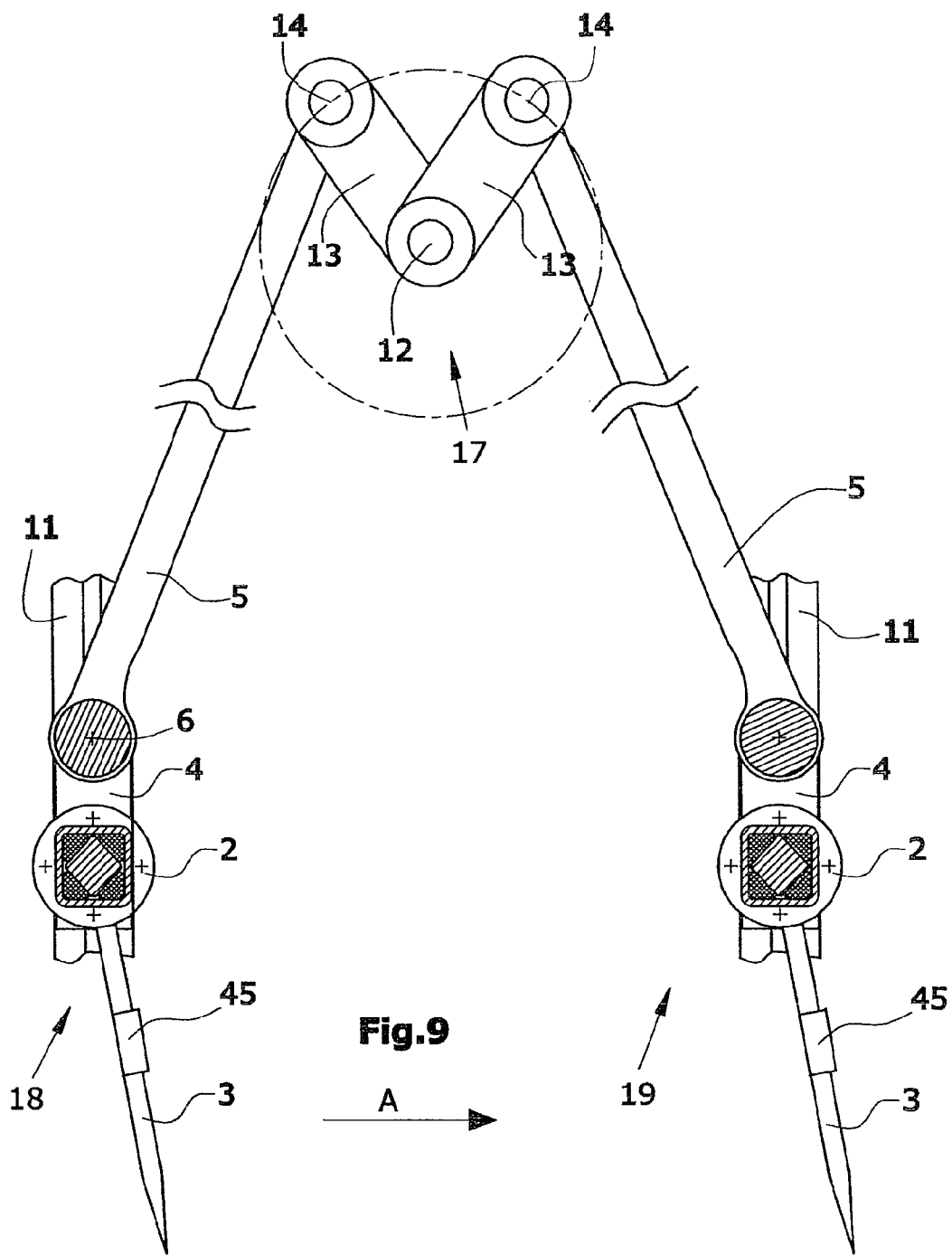

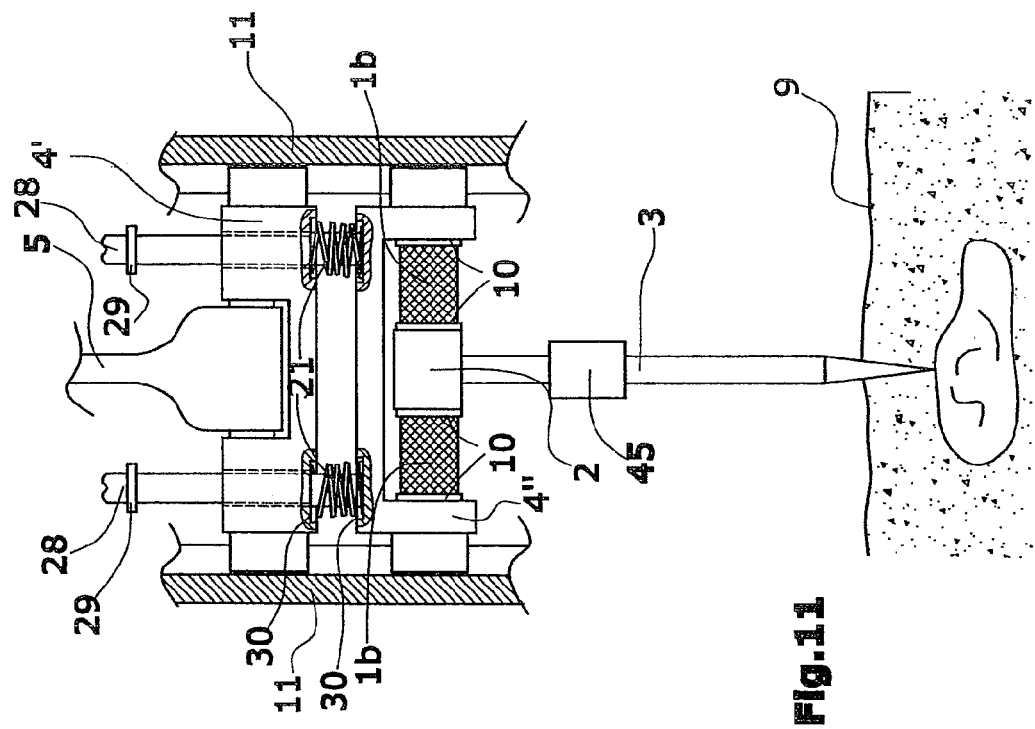
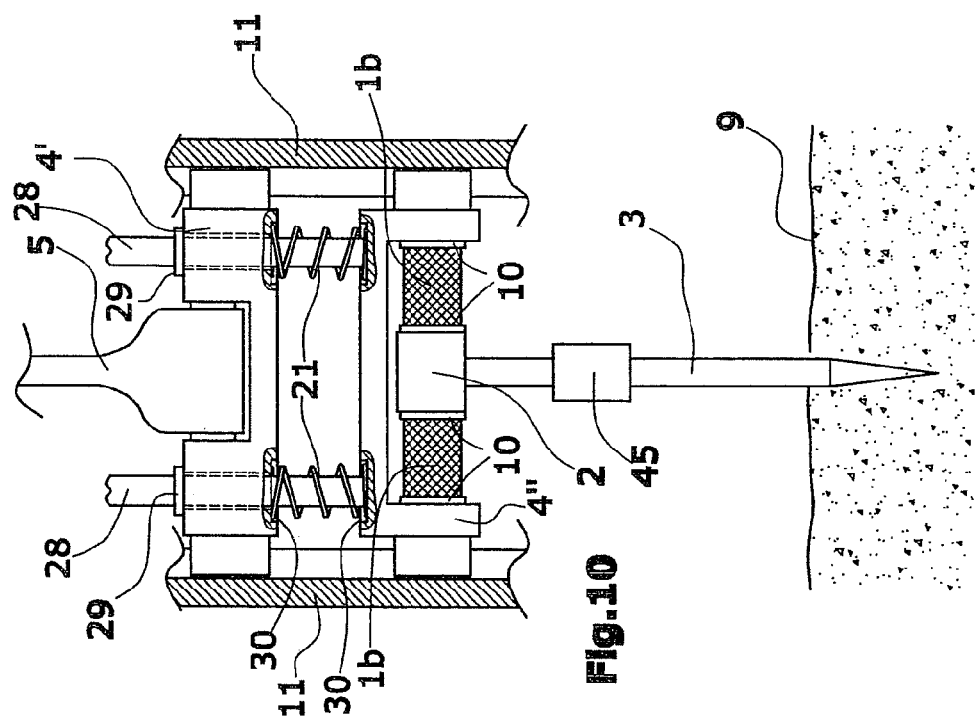

SOIL WORKING DEVICE

CROSS REFERENCE TO RELATED APPLICATIONS

This application is a divisional of U.S. application Ser. No. 12/073,478 filed Mar. 6, 2008, now pending, which claims the benefit of and priority to European Application Nos. 07103568.7 and 07106825.8, filed Mar. 6, 2007 and Apr. 24, 2007, respectively, all of which are incorporated herein by reference in their entireties.

BACKGROUND OF THE INVENTION

1. Field of the Invention

The invention refers to a mobile soil working device for creating cavities in the soil.

2. Description of Related Art

Such devices are used to create cavities in soil by means of penetration tools, wherein slot-shaped cavities are formed in the deeper regions of the soil and holes as small as possible are left at the ground surface. The cavities allow for a better drainage of water and improve the aeration of the soil, and the loosening of the soil enhances plant growth, especially of grasses.

The soil working devices heretofore used for such purposes and known from Japanese Laid-Open Publication No. JP-A-55089538 have support arms arranged in the manner of a parallelogram that are configured like telescopes and each has a spring connected in parallel thereto, respectively, so that the support arms are variable in length against a spring force. One end of the support arms is hinged to the machine frame, and the other end is hinged to a tool holder for penetration tools. The pushrod of a crank drive is hinged to the tool holder for the penetration tools and drives the same, so that the latter moves up and down with the penetration tools. When penetrating into the soil, the penetration tools can be pivoted against the travelling direction of the soil working device by varying the length of the support arms.

From European Laid-Open Publication EP-A-0037595, another soil working device is known that uses two support arms guided in a parallelogram-like manner, pivotally supporting a tool holder at one end, while their other end is pivotally supported at the machine frame, respectively. The pushrod of the crank drive is hinged to the tool holder and drives the same such that it moves up and down. One of the two support arms is adjustable in length and includes a stop spring means. As long as the penetration tool is outside the soil, the support arm rests against the stop because of the spring force. With the penetration tool driven into the soil and the soil working device moving forward, the penetration tool with the tool holder is pivoted against the travelling direction and the length-adjustable support is elongated against the spring force.

The previously known soil working devices are complex structures with many machine parts that are moved along during the penetrating operation. The mass inertia is therefore relatively high so that the working speed of the devices is limited. It is another problem that the penetration tools or machine elements of the previously known soil working devices could be damaged in soils holding large stones, for example, when they hit stones or the like upon penetration.

SUMMARY OF THE INVENTION

It is thus an object of the present invention to provide a device of the above described type, in which fewer machine parts are moved along upon penetration, whereby the working speed can be increased.

The invention advantageously provides that a soil working device of the initially described type comprises a machine frame, at least one penetration tool adapted for up and down movement, the penetration tool being adapted to be driven into the soil and to be pulled out again, at least one tool holder for the penetration tool, and at least one guide element. The tool holder is supported for pivotal movement about a first pivot axis in the guide element, which guide element can be moved up and down by the drive. Between the tool holder and the guide element, a torsion element is arranged coaxial with the first pivot axis. With the penetration tool plunged in and the device moving on, the penetration tool, and thus the tool holder, can be pivoted with respect to the guide element. When the force effect ceases, i.e. as soon as the penetration tool is outside the soil, a restoring moment is generated acting on the tool holder, so that, due to the torsional moment, the tool holder with the penetration tool pivots back to the home position.

This embodiment has the advantage of a smaller number of machine parts having to be moved during the penetration movement, whereby the mass inertia is reduced. Thus, the penetration tools can give way faster against the travelling direction, especially while they are engaged in the soil. The holes formed in the soil surface can thus be kept small so that they are not substantially larger than the diameter of the penetration tool.

It is another advantage that no stops are needed to return the penetration tools to the home position assumed before penetration. Thus, the impact load on the machine frame, the machine elements and, especially, their bearings is absent. Therefore, the service life of the bearings in particular, but also of the machine parts can be extended. Moreover, vibrations occurring during operation are reduced to a substantial extent.

It is an additional advantage that the soil working device can not only be moved forward when penetration tools are engaged in the soil, but also backward, since it has no stop. Generally, the corner regions of the areas to be worked are difficult to reach with a soil working device. Because of the backward drive possible, the corners can be reached better.

The torsion element may be formed by an elastomeric element, e.g. a rubber spring element or a helical or coil-shaped torsion spring, e.g. a metal torsion spring. Preferably, the torsion element is a composite element and is formed of both an elastomer material and a metal material.

When using an elastomer or a combination of an elastomer and a metal as the torsion element, it is another advantage that less vibrations can be transmitted to the entire soil working device and the tractor. Thus, vibration effects on persons operating the soil working device can be reduced significantly.

In another embodiment of the invention, it is provided that the guide element, at which the tool holder is pivotally supported, is guided along a guide mounted at the machine frame. This guide may be linear or it may be curved especially at the upper part so that the forces exerted on the guide by the crank drive are reduced.

The angle of the guide in a vertical plane parallel to the travelling direction can be adjusted with respect to the machine frame either individually or centrally, and thereby the angle under which the penetration tool penetrates into the soil can be adjusted. This is advantageous over prior art as known heretofore in that the penetration angle can be adjusted centrally without using a stop, when all guides of the guide elements, and thus of the penetration tools, are adjusted in common.

In further embodiments of the invention, it is provided that a plurality of penetration tools or several sets of penetration tools are arranged side by side in the soil working device, and that these are adapted to be driven in a manner phase-shifted with respect to each other.

Moreover, these penetration tools or sets of penetration tools can be arranged in at least two rows situated behind each other in the travelling direction. At least two penetration tools or sets of penetration tools, following each other in the travelling direction, can be driven by the same crank drive, these penetration tools or sets of penetration tools preferably being driven in a phase-shifted manner. Here, the crank drive is synchronized to the travelling speed such that, during the phase when the penetration tools are not engaged in the soil, the penetration tools of the two rows travel such a distance that, seen in the travelling direction, the penetration tools of the second row can be driven into the soil in front of the holes made by the penetration tools of the first row.

This is advantageous in that, with a plurality of successive rows of penetration tools, the working speed of the soil working device can be increased.

In an alternative embodiment of the invention, stops fastened to the machine frame can be provided, which may be adjusted centrally or individually and which limit the return movement of the penetration tools in order to change the penetration angle.

In another embodiment, the guide element may be a support arm hingedly mounted to the machine frame. In this case, a pivotally supported link arm may be provided for a tool holder, which arm is in direct contact with the stop before penetrating the soil and which has its end remote from the tool holder pivotally supported at an intermediate element which in turn is pivotally supported at the machine frame.

In another embodiment of the invention, the guide element is of bipartite structure, the two parts of the guide element being guided in the same guide. At least one compression spring is provided between the upper and the lower guide element, the spring allowing for a deflection of the at least one penetration tool in the event of an unusually high resistance to soil penetration. This spring should have a great spring stiffness and deflect only at a certain force. Under normal soil conditions, the penetration tool can smoothly make the predefined movement, since the spring force of the compression spring is greater than the resistance to soil penetration of soils usually worked is. This has the advantage that the soil working device can also be used if stones or gravel are included in the soil. With the soil working devices known heretofore, the penetration tools or machine elements could be damaged when the penetration tools hit stones or the like. The soil working device of the present embodiment may thus also be used to work ski slopes where stones or rocks are often below the coat of snow.

A development of the invention may provide that the height of the stroke performed by the guide element, and thus by the tool holder, is adjustable. The adjustment may be achieved, for example, by making the distance of the crank pin receiving the crank rod to the rotary axis of the crankshaft adjustable. The webs connecting the crank pins with the crankshaft pins are formed with elongate holes. The crank pins can be shifted in these elongate holes and may be fastened at different positions.

In a preferred embodiment, the height of the stroke can alternatively be adjusted by changing the distance between the crankshaft and the guide element at which the tool holder is pivotally supported. This is achieved, for example, by setting another horizontal position of the guide element relative to the crankshaft.

This horizontal distance may also be adjusted individually or centrally for a plurality of penetration tools arranged side by side. This is advantageous in that the tools need not be changed should it be desired to change the depth of the cavities formed in the soil.

In another embodiment of the invention, it is provided that the pushrod is configured so as to be compressible against a spring force, wherein, given the usual soil resistance, a penetration without or with little deflection of the at least one penetration tool is possible, and a deflection of the penetration tool is possible, if the soil resistance is much higher than the soil resistance to be expected usually, e.g. with rocky subsoils.

A further embodiment provides that soil working device of the type initially described comprises a machine frame, at least one drive comprising at least one push rod, at least one penetration tool adapted to be moved up and down by means of the pushrod, the penetration tool being adapted to be driven into the soil and to be pulled therefrom again, at least one tool holder for the penetration tool and at least one guide element. The tool holder is supported for pivotal movement about a first pivot axis in the guide element, which guide element can be moved up and down by the drive, thereby allowing the penetration tool to pivoted against a spring force while engaged in the soil. The pushrod is made compressible against a spring force, whereby it is possible for the at least one penetration tool to be driven into the soil, given a typical soil resistance, and for the pushrod, and thereby the penetration tool, to deflect when the soil resistance is considerably higher that the typical soil resistance.

Preferably, the spring force is exerted by a spring element which, in the two latter embodiments, is a helical or coil-shaped tension or compression spring element. However, the spring element may also be and elastomer, an elastomer/metal composite element or a tension or compression spring extrusion-coated with an elastomer.

As an alternative, the spring element may be a pneumatic, hydraulic or magnetic tension or compression spring.

In an embodiment of the invention, it is provided that the torsion element comprises at least two magnetic elements. The two magnetic elements are arranged such with respect to each other that, with a torque acting on the tool holder about the first pivot axis, they allow for a pivoting of the tool holder about the first pivoting axis and exert a magnetic restoring moment on the tool holder when the torque acting ceases, so that the penetration tool pivots back to the home position.

Such a torque acting about the first pivot axis occurs when the penetration tool is in the soil and the soil working device moves on. The torque acting ceases as soon as the penetration tool is outside the soil again.

The following is a detailed description of embodiments of the invention with reference to the drawings.

BRIEF DESCRIPTION OF THE SEVERAL VIEWS OF THE DRAWINGS

FIG. 2a is a front view, partly in section, of an embodiment of a penetration tool according to the invention.

FIG. 2b is a side elevational view of the embodiment of FIG. 2a.

FIG. 2c is a front view, partly in section, of a variant of the embodiment of FIG. 2a.

FIG. 9 is a side elevational view of another embodiment with two rows of successively arranged penetration tools or sets of penetration tools.

FIG. 10 is a front view of another embodiment, wherein the penetration tool is adapted to deflect when the soil resistance is unusually high.

FIG. 11 is a front view of the embodiment of FIG. 10, with the penetration tool deflected.

DETAILED DESCRIPTION OF THE INVENTION

Figure 1:
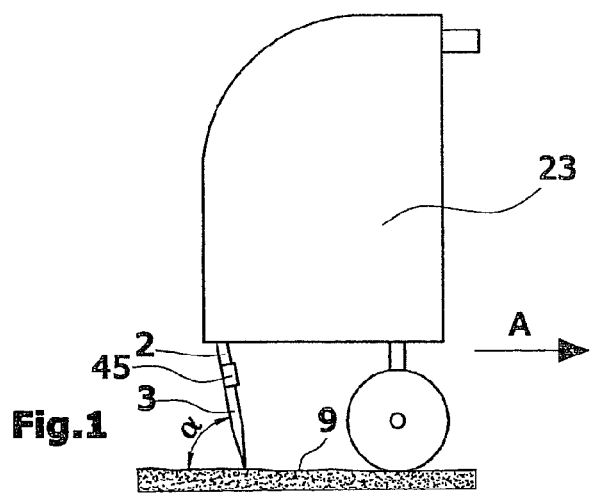
FIG. 1 is a side elevational view of a soil working device.

FIG. 1 is a side elevational view of a mobile soil working device that is self-propelled or may be pulled by a tractor. This soil working device has a machine frame 23 in which a plurality of penetration tools 3 are pivotally supported, the penetration tools being adapted to be moved up and down. The penetration tools 3 are alternately pushed into the soil 9 and make a tilting movement in the soil 9 due to the forward movement of the soil working device, during which the soil 9 is broken below the penetration hole, whereby the drainage of the soil 9 is improved, for example. It is intended that the penetration hole remains as small as possible despite the travelling speed of the soil working device.

The penetration tools 3 are fastened to a tool holder 2, preferably by means of a holding device 45. Penetration tools of different lengths and shapes as well as diameters can be fastened to the tool holder 2 which is guided by a guide element 4. The guide element 4 performs an up and down movement, preferably driven by a crank drive 17. As an alternative, it is also possible to drive the guide element 4 hydraulically or electrically.

At the guide element 4, the tool holder 2 is supported for pivotal movement about a pivot axis 40, the tool holder 2 receiving a penetration tool 3 or a set of penetration tools 3 that can be driven into the soil and be pulled out therefrom due to the up and down movement. A plurality of penetration tools 3, preferably arranged side by side, or a plurality of juxtaposed sets of penetration tools 3 can be driven. The penetration tools or sets of penetration tools are preferably driven in a phase-shifted manner.

Figures 2A, 2B:
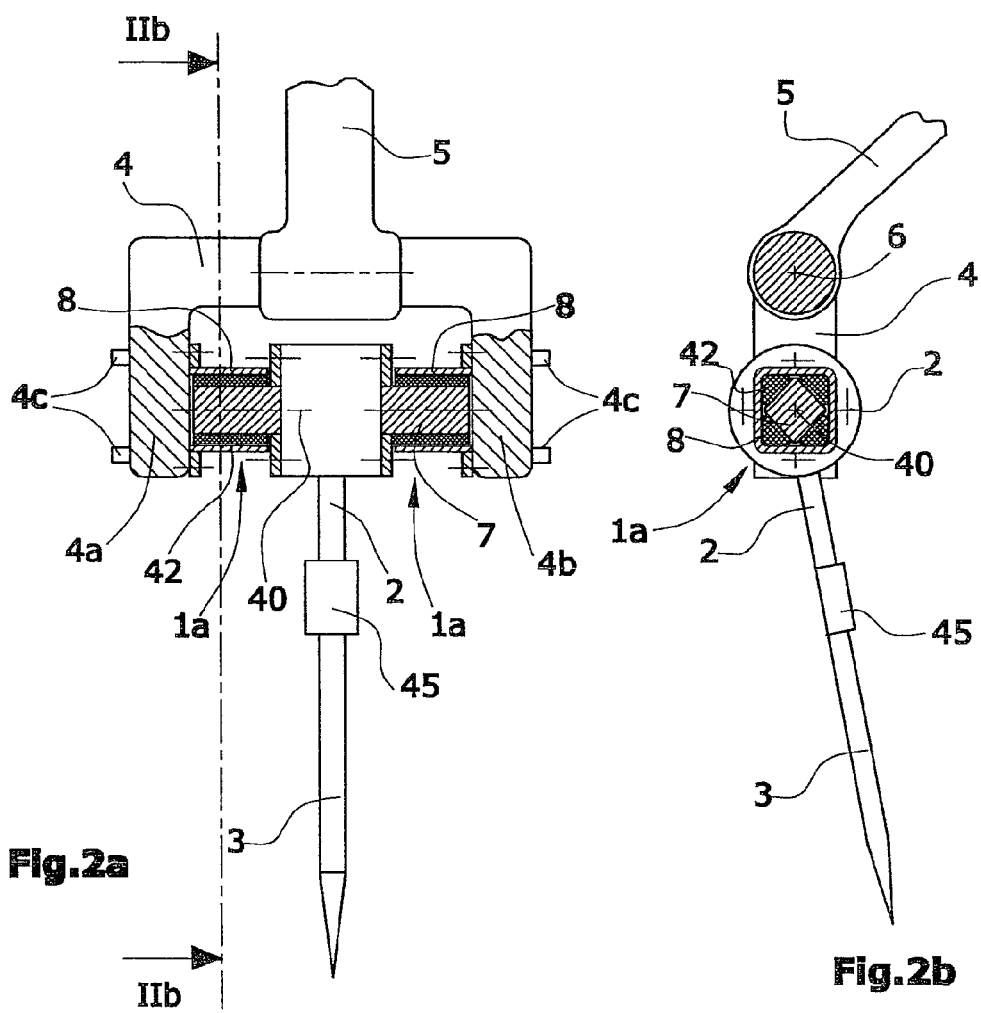

FIG. 2a is a front view and FIG. 2b is a side elevational view of a guide element 4 with a tool holder 2 and a penetration tool 3. A pushrod 5 is driven by means of a crank drive 17. The pushrod 5 is linked to the guide element 4 via a first pivot bearing 6. Driven by the pushrod 5, the guide element 4 can make an up and down movement along a guide 11. The tool holder 2 is supported at the guide element 4 for pivotal movement about a pivot axis 40. At least one penetration tool 3 is mounted to the tool holder 2. Between the tool holder 2 and the guide element 4, a torsion element 1a is provided that acts coaxial with the pivot axis 40. The guide element 4 preferably receives the tool holder 2 between two arms 4a, 4b that are guided in the guide 11 using lateral guide pins 4c.

Prior to penetration, the torsion element is unloaded, a predetermined penetration angle of the penetration tool 3 being set in the initial position just before penetration. With a force acting on the penetration tool 3, i.e. with the penetration tool 3 driven into the soil and the soil working device moving on in the travelling direction A, the torsion element allows for the penetration tool 3 to pivot against the travelling direction. When the force effect ceases, i.e. after the penetration tool 3 has been pulled from the soil 9, the torsion element exerts a restoring moment on the tool holder 2 so that the penetration tool 3 pivots back to the home position after having been pulled out.

The torsion element in FIGS. 2a and 2b, may be a metal/elastomer composite element 1a, as available from the company Rosta, for example. The elastomer/metal composite element has a housing 8 preferably formed by a square or triangular hollow profile. The elastomer/metal composite element further has a central rod 7 situated within the housing 8, which preferably also has a square or triangular cross section. As an alternative, both the housing 8 and the rod 7 may have a generally polygonal cross section.

For example, with substantially square profiles of the housing 8 and the rod 7, the rod 7 is arranged offset by an angle of rotation of 45° with respect to the housing 8. Between the housing 8 and the rod 7, elastomeric elements 42 are arranged in the corners of the housing 8 that extend along substantially the entire length of the housing 8 and the rod 7. Under the action of a torque, the rod 7 can be rotated with respect to the housing 8. Here, the elastomeric element 42 are compressed and an elastic restoring moment is generated. With a triangularly shaped cross section of the housing 8 and the rod 7, a larger angle of torsion can be used.

In FIGS. 2a and 2b, the rod 7 is connected with the tool holder 2 in a torque-proof manner and the housing 8 is connected with the guide element 4 in a torque-proof manner.

Figure 2C:
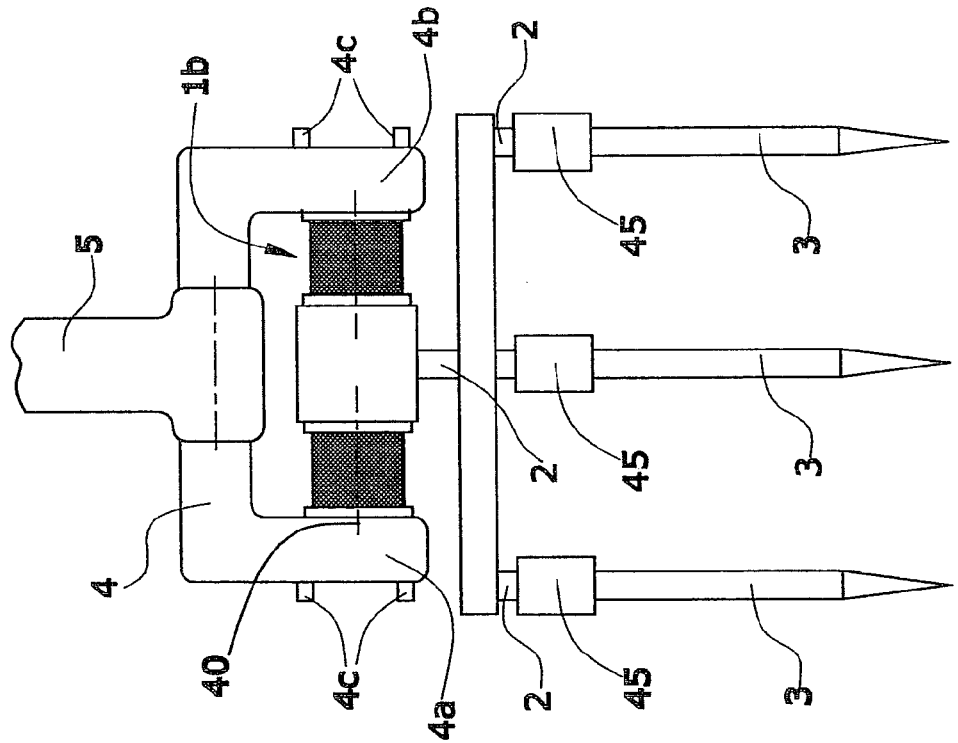

In FIG. 2c, two coupled elastomer/metal composite elements 1a are arranged side by side to obtain a larger angle of torsion. The two rods 7 are fixedly connected or, preferably, integrally formed. One of both housings 8 is attached to the guide element 4, while the other housing 8 is mounted to the tool holder 2. For a better absorption of vertical forces, a sleeve 46 may be provided that encloses both housings 8.

As an alternative, instead of the rod 7, the two housings 8 could be fixedly connected with each other or, preferably, be of an integral structure, while the rod 7 may be bipartite. In this case, one of the rods 7 is connected with the guide element 4 in a torque-proof manner and the other rod 7 is connected with the tool holder 2 in a torque-proof manner.

The penetration tool's 3 angle of penetration into the soil corresponds to the angle _ between the penetration tool 3 and the soil surface 9. This angle can be adjusted by changing the angle of the tool holder 2 with respect to an orthogonal plane transverse to the travelling direction.

Figure 3:
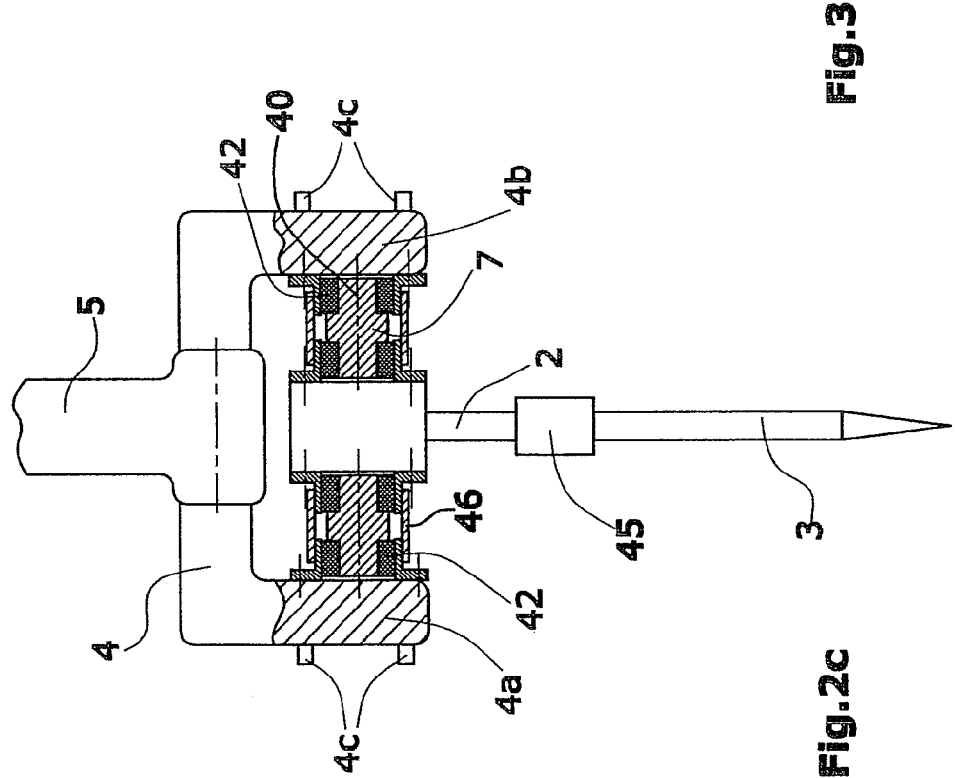
FIG. 3 is a front view of another embodiment with an elastomeric element as the torsion spring element, for a penetration tool.

FIG. 3 illustrates another embodiment, in which an elastomeric element 1b us used as the torsion element. In this embodiment, the elastomeric elements are arranged on both sides transversely to the travelling direction between the tool holder 2 and the guide element 4. A plurality of penetration tools 3 can be attached to the tool holder 2. The ends of the elastomeric elements are fastened directly at the guide element 4 and the tool holder 2, respectively.

At the ends, the elastomeric elements may comprise scorched connection flanges 10 as connection elements, for example, which in turn may be fastened to the tool holder 2 or the guide element 4. The angle of penetration _ may also be adjusted by changing the angle between the penetration tools and the tool holder 2 when fastening the penetration tools.

The maximum possible angle of torsion between the guide element 4 and the tool holder 2 depends on the length L of the elastomeric elements 1b. The longer the elastomeric element 1b, the larger the angle of torsion can be. To strengthen the elastomeric element 1b, a preferably coaxial metal pin may be provided inside the same parallel to the longitudinal dimension thereof. The pin may be rotatably supported at the adjoining connection flanges 10 or at the tool holder 2 and/or at the guide element 4.

Another possibility provides a composite element of elastomeric elements and coil-shaped or helical metal torsion springs. In this case, the metal springs are enclosed by the elastomeric material. Again, metal pins can be provided preferably coaxially on the inside for reinforcing purposes.

Figure 4:
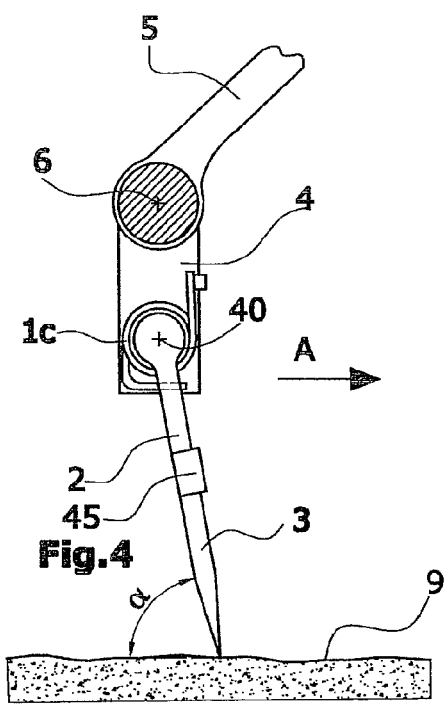
FIG. 4 is a side elevational view of another embodiment using a coil-shaped or helical torsion spring as the torsion element.

The side elevational view of FIG. 4 illustrates the same embodiment as shown in FIGS. 2a and 2b, with the difference that the torsion element is coil-shaped or helical metal torsion spring 1c extending coaxially with the pivot axis 40. One side of the metal spring is connected with the guide element 4 in a torque-proof manner, while the other side is connected with the tool holder 2 in a torque-proof manner. Here, it is also possible to use a coaxial axle- or sleeve-shaped support element for reinforcement. These support elements may also be rotatably supported at the tool holder and the guide element.

Figure 5:
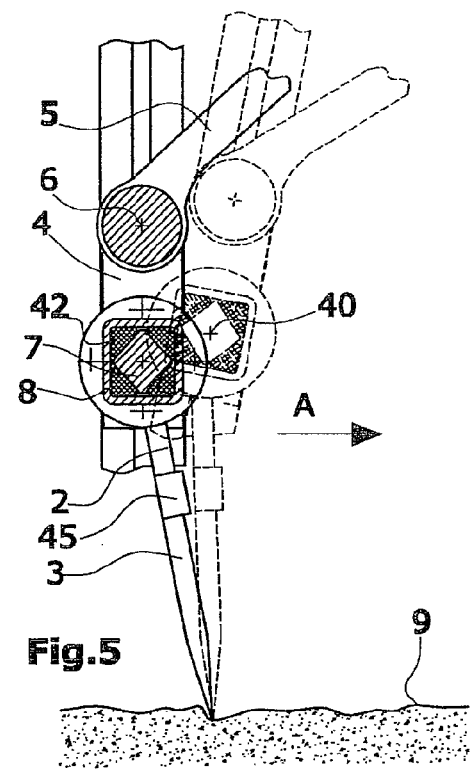
FIG. 5 is a side elevational view of the first embodiment with a pivotable linear guide of the guide element.

The side elevational view in FIG. 5 illustrates one of the guides 11 that guide the guide element 4 on both lateral sides. The at least one guide 11 is mounted to the machine frame 23 not illustrated in FIG. 5. The guide 11 is tiltable in a vertical plane parallel to the travelling direction (phantom lines) so that the angle of the guide 11 can be adjusted relative to the machine frame 23. Thus, the angle of penetration _ of the penetration tools 3 is also adjusted in the vertical plane. The angles of a plurality of guides 11 arranged side by side in a row transversely to the travelling direction may be centrally adjustable using an adjustment means. Thus, also the penetration angles of the penetration tools or sets of penetration tools in a row can be adjusted centrally.

The juxtaposed penetration tools or sets of penetration tools can be driven in a phase-shifted manner. The guides 11 may also be horizontally displaceable in parallel with the travelling direction so that the stroke of the up and down movement is adjustable because of the changed distance from the crank drive 17. FIG. 5 illustrate the penetration tool just before penetrating the soil 9.

Figure 6:
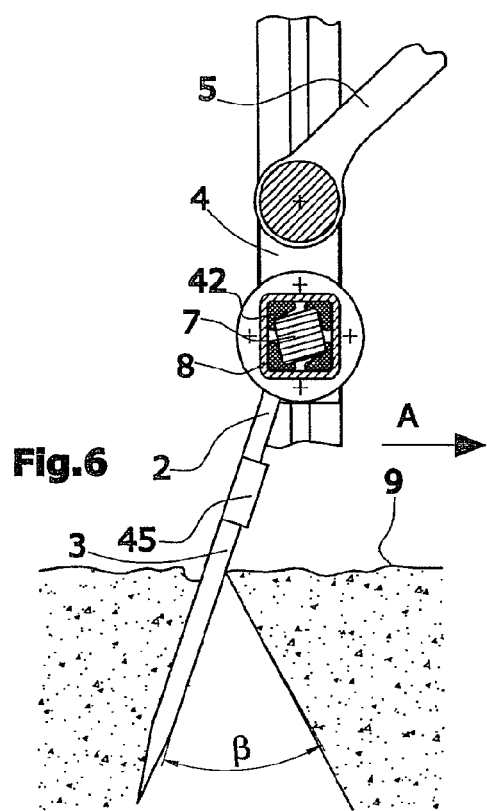
FIG. 6 is a side elevational view of an embodiment with the penetration tool driven into the soil.

FIG. 6 shows the same side elevational view as FIG. 5 with the difference that the soil working device has moved on in the travelling direction. The penetration tool 3 is in the soil 9 and has been pivoted due to the forward movement. The penetration tool 3 has made a pivotal movement over an angle _ up to this point.

Figure 7:
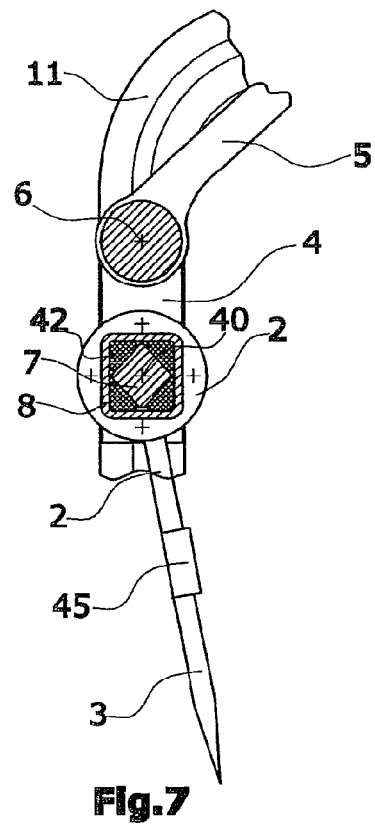
FIG. 7 is a side elevational view of another embodiment with a guide curved in the upper part, in particular.

FIG. 7 is a side elevational view illustrating a guide 11 curved, in particular, at the upper part thereof. The guide 11 is bent towards the crank drive 17 so that the angle of the force effect exerted by the pushrod 5 on the guide 11 via the guide element 4 is altered such that the load on the guide 11 caused by transversal forces is reduced. In this manner, the wear and the friction are reduced.

Figure 8:
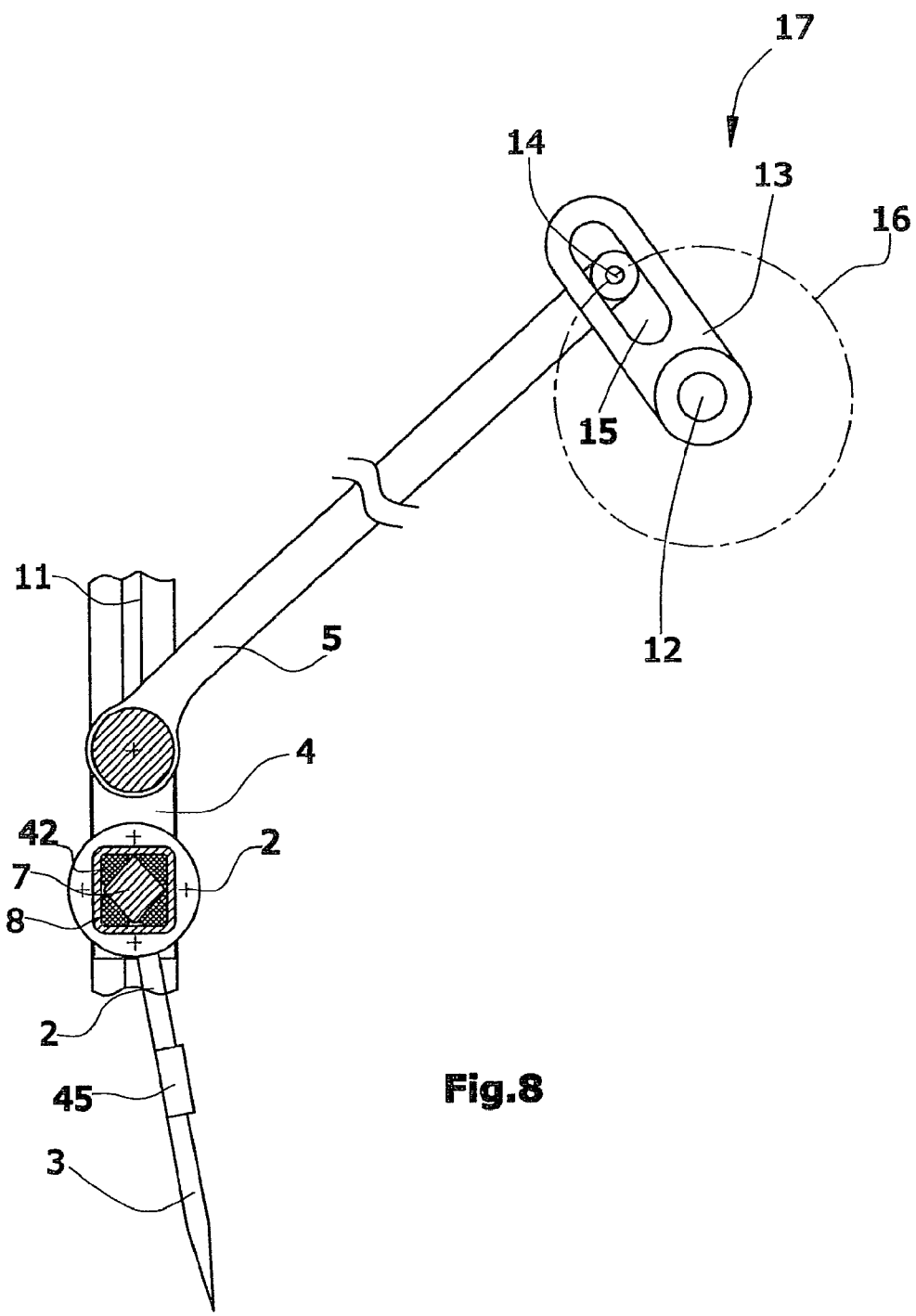
FIG. 8 is a side elevational view of another embodiment with a variable orbit diameter of the crank drive.

FIG. 8 is a side elevational view of an embodiment with a linear guide 11. the flanges 13 of the crank drive 17 connect crank pins 14 with a crankshaft 12. The crank pins 14 receive the pushrod 5. In this embodiment, the flanges 13 are provided with elongate holes 15 so that the effective radius about the axis of rotation of the crankshaft 12 can be changed. For this purpose, the end of the pushrod 5 on the side of the crank drive may be mounted at different radial positions. By changing the effective radius, the stroke of the up and down movement of the guide elements 4 can be varied. The orbit travelled by the crank pin 14 about the crankshaft 12 is represented by the orbit 16.

FIG. 9 is a side elevational view illustrating two rows 18 and 19 of penetration tools or sets of penetration tools arranged one behind the other in the travelling direction and driven by a common crank drive 17.

At the crank drive 17, two preferably angularly offset crank pins 14 receive a pushrod 5, respectively. The penetration tools 3 in the rows 18 and 19 are preferably driven in a phase-shifted manner. Here, the crank drive 17 can be coupled to travelling speed that the holes made by the penetration tools 3 in the rear row 18, seen in the travelling direction, lie in front of the holes previously made by the penetration tools 3 of the first row 19.

The FIGS. 4 to 9 each illustrate the elastomere/metal composite element 1a of the first embodiment. As an alternative, it is also possible to use the described alternative torsion elements in all embodiments.

FIG. 10 is a front view of another embodiment in which the guide element 4 is of bipartite structure, the two parts of the guide element 4', 4" being guided in the same guide. At least one compression spring 21 is arranged between the upper 4' and the lower guide element 4". The two parts of the guide element 4', 4" are biased against each other by the springs 21, with rods 28 limiting the distance between both parts of the guide element 4', 4", caused by the springs 21, and bias the springs. These rods 28 are preferably arranged coaxial with the springs 21 and also serve as guide elements for the springs 21. Recesses 30 may be provided in both parts of the guide element 4', 4" to receive a spring 21. The pushrod 5 is pivotally supported at the guide element 4'.

FIG. 10 illustrates the penetration tool 3 driven into the soil. This embodiment is advantageous in that upon the occurrence of an unusually high resistance in the soil, i.e. when the penetration tool hits a stone, the springs 21 can deflect as obvious from FIG. 11. The maximum deflection of the springs 21 is adapted to the maximum penetration depth of the penetration tools 3. In this respect, FIGS. 10 and 11 are not drawn to scale but are merely schematic. Thus, damage to the machine or the tool is avoided. The springs have a high spring stiffness so that they deflect only at and above a relatively strong force effect, i.e. when the soil penetration resistance substantially exceeds a normal degree. Nuts or spacer discs 29 serve to adjust a predetermined bias force that has to be overcome by the soil resistance for the penetration tool to deflect. The bias force is thus set higher than the penetration force of the penetration tools 3 required to overcome the soil resistance force during an appropriate use of the soil working device e.g. on sports and lawn surfaces.

Figure 12:
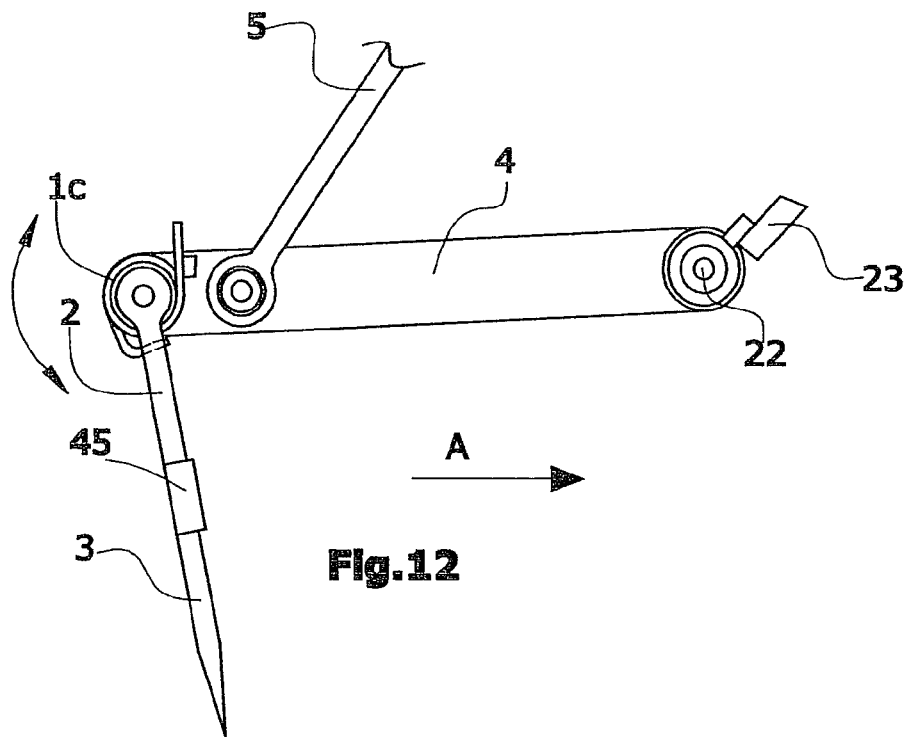
FIG. 12 is a side elevational view of another embodiment with a support arm.

FIG. 12 illustrates an embodiment with support arms 4. In this case, the guide element 4 is formed by at least one support arm 4 pivotally mounted in a pivot bearing 22 at the machine frame 23. The penetration angle can be adjusted at the tool holder 2 by fastening the tool holder 2 in another angular position relative to the support arm 4.

Figure 13:
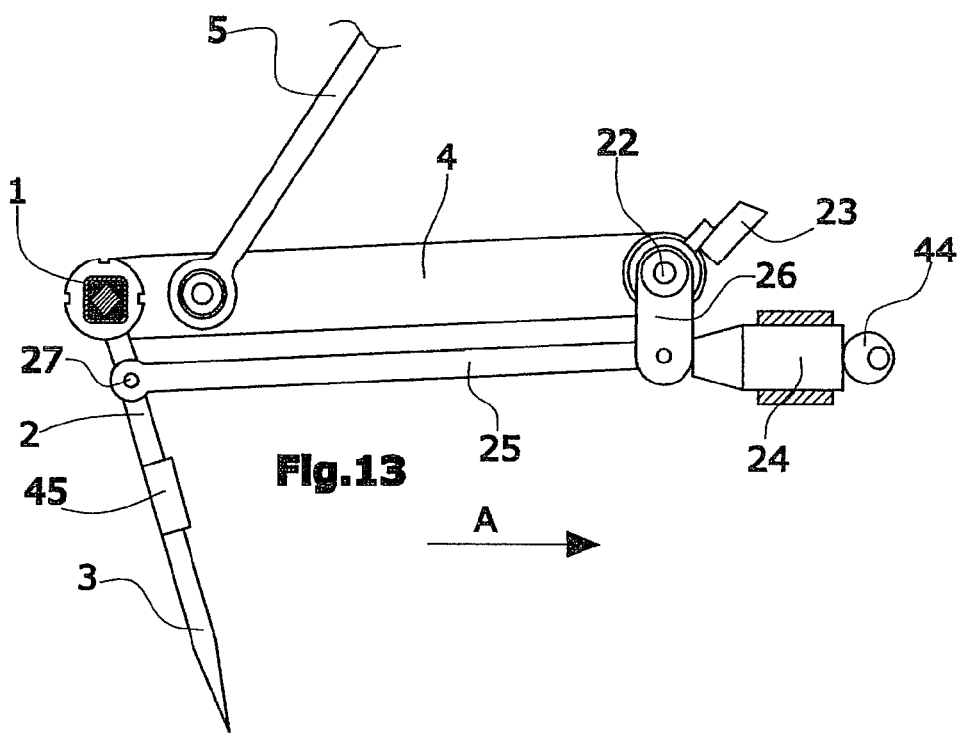
FIG. 13 is a side elevational view of another embodiment with a support arm and a stop.

FIG. 13 illustrates a modified embodiment of FIG. 12, in which, in addition, a link arm 25 is pivotally supported at the tool holder 2 for central adjustment of the penetration angle, which arm is in direct contact with the stop 24 prior to penetration and whose end averted from tool holder is pivotally supported at the intermediate element 26 which in turn is pivotally supported at the machine frame 23. The stop 24 may be adjusted centrally by means of an eccentrically supported bar 44, for example. The stop 24 limits the return movement of the penetration tools 3 back to the home position. Thus, the penetration angle of the penetration tools 3 can be adjusted centrally. As an alternative, the penetration angle may also be adjusted individually, by fastening the stop means directly on the support arm 4.

Figure 14:
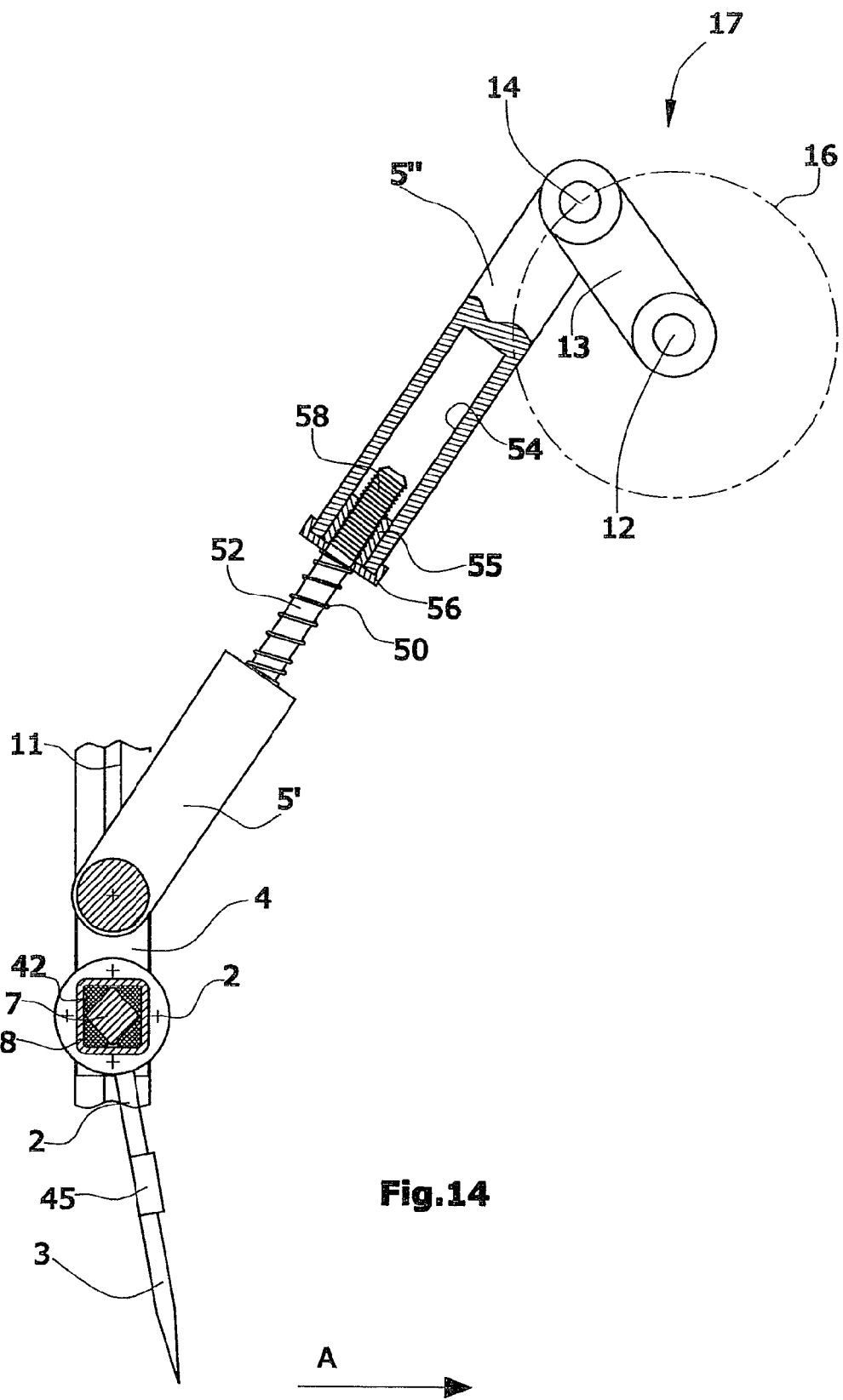
FIG. 14 is a side elevational view of another embodiment with a bipartite pushrod.

FIG. 14 illustrates another embodiment comprising a bipartite compressible pushrod 5. Between both parts 5', 5" of the pushrod 5, a spring element 50 in the form of a compression spring is provided that allows the pushrod 5, and thus indirectly the penetration tool 3, to deflect. The upper part 5" of the pushrod 5 is connected with the crank drive, and the lower part 5' of the pushrod 5 is connected with the guide element 4. The guide element 4 is guided along the guide 11.

The spring element 50 is a helical or coil-shaped compression spring sitting on a piston rod 52 to which the lower part 5' of the pushrod 5 is fastened. The two parts 5', 5" of the pushrod 5 are of telescopic structure. A piston and adjustment element 55 is provided biasing the spring element 50 in a variably adjustable manner and guiding the lower part 5' of the pushrod 5 within a bore 54 in the upper part 5" of the pushrod 5. The sleeve-shaped piston and adjustment element 55 has a smooth outer cylinder surface so that it may serve as a piston element in the bore 54 in the upper part 5" of the pushrod 5. An inner thread of the piston and adjustment element 55 allows for a variable adjustment of the bias force. The value of the bias force depends on how far the piston and adjustment element 55 is screwed onto a threaded bolt 58 at the end of the piston rod 42.

The spring element 50 is biased and should have a high spring stiffness so that it deflects only when the compression force acting between the parts 5', 5" is greater than the bias force set, and which is certainly less than the weight-force of the soil working device. Under normal soil conditions, the penetration tool 3 can perform the defined movement smoothly, since the spring force of the compression spring 50 is stronger than the soil penetration resistance of soils normally worked. The spring characteristics are adapted both to the required penetration force of the penetration tools 3 and to the weight of the soil working device.

The operation of the biased compression spring 50 corresponds to the operation already described in connection with the springs 21 in FIGS. 10 and 11.

Figure 15:
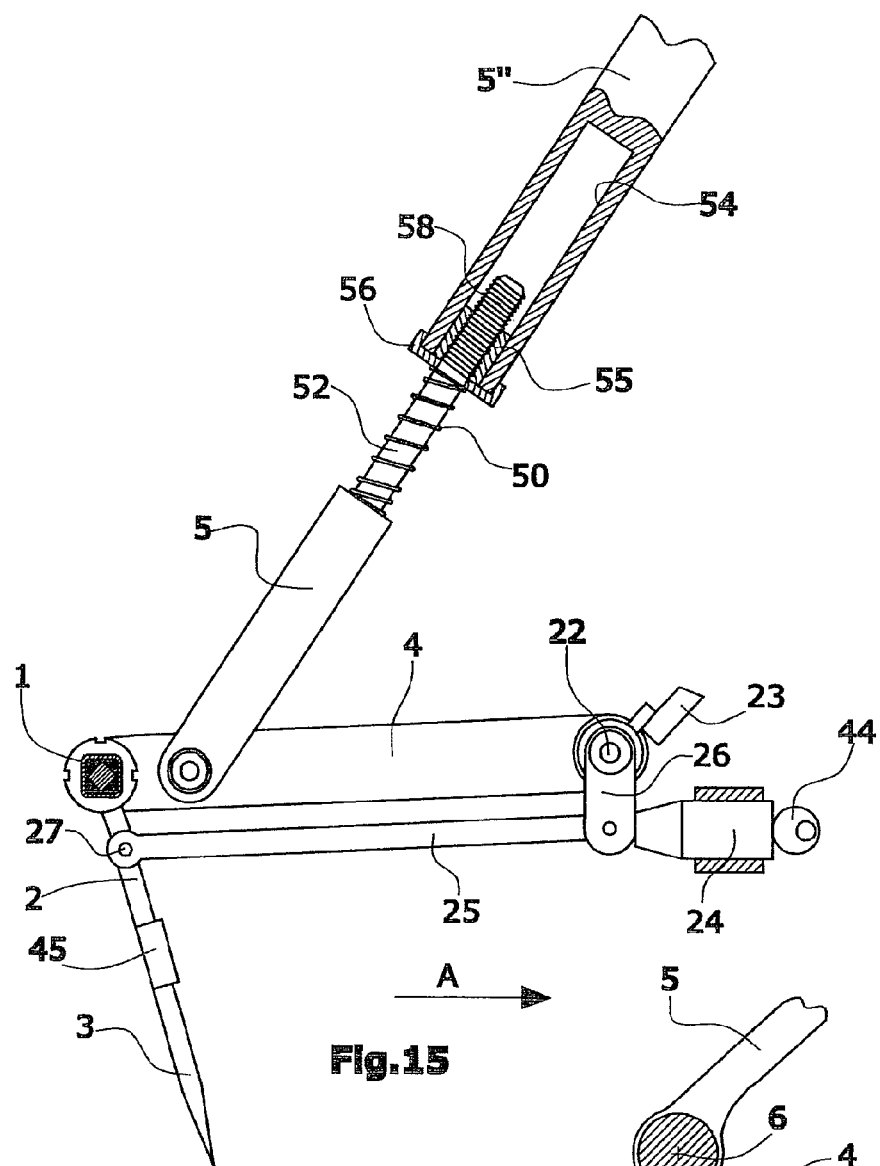
FIG. 15 is a side elevational view of another embodiment, also comprising a bipartite pushrod.

FIG. 15 also illustrates the bipartite telescopic pushrod 5', 5" with the spring element 50 arranged therebetween. However, in this embodiment, the guide element 4 is configured as a support arm.

As an alternative, the bipartite telescopic pushrod 5', 5" may also be used in an embodiment in which, as already known from prior art, a tension or compression spring element or a damping spring element is used that is preferably arranged in parallel with the support arm.

Figure 16:
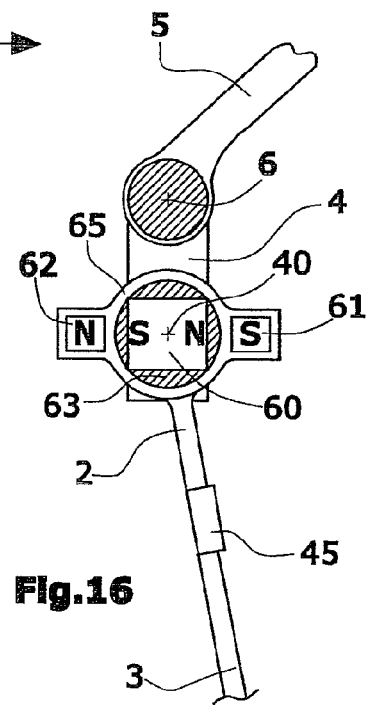
FIG. 16 is a side elevational view, partly in section, of an embodiment of a penetration tool with a torsion element formed by two magnets.

FIG. 16 illustrates another embodiment comprising a torsion element having at least two magnetic elements. One magnetic element 60 is situated within an axle-shaped holding element 63 and is connected therewith in a torque-proof manner. The holding element 63 is connected with the guide element 4 in a torque-proof manner. The holding element 63 has a circular cross section. The holding element 63 is surrounded by at least one further movable magnetic element 65 fixedly connected to the tool holder 2. The tool holder 2 can be pivoted about the first pivot axis 40 relative to the holding element 63 serving as a pivot bearing. The north pole 62 and the south pole 61 of the second magnetic element 65 are arranged separately from each other and offset by 180° with respect to the first pivot axis 40. The movable magnetic element 65 may also be supported by an electrically insulated roller bearing on the holding element, e.g. by a roller bearing having ceramic elements.

As long as the penetration tool 3 is in the home and rest position, the north pole 62 of the second magnetic element 65 is located on the side of the south pole of the first magnetic element 60 and the south pole 61 of the second magnetic element 65 is situated on the side of the north pole of the first magnetic element 60.

With the penetration tool 3 driven into the soil and the soil working device moving on, the tool holder 2 is pivoted about the first pivot axis 40 relative to the holding element 63, against a magnetic moment. As soon as the penetration tool 3 is outside the soil, the magnetic restoring moment of the magnetic elements 60, 65 causes the penetration tool 3 to return to its home position.

The magnetic elements 60, 65 may be permanent magnets or solenoids. In the case of a solenoid, it is possible to turn on the current only during certain phases of movement, e.g., when the penetration tool 3 is not in contact with the soil. T The holding element 63 and the guide element are preferably made of non-magnetizable or poorly magnetizable material such as, for example, non-magnetizable steel (submarine steel), high-strength metals, plastic materials, preferably thermoset resins, or ceramic material.

Although the invention has been described and illustrated with reference to specific embodiments thereof, it is not intended that the invention be limited to those illustrative embodiments. Those skilled in that art will recognize that variations and modifications can be made without departing from the true scope of the invention as defined by the claims that follow. It is therefore intended to include within the invention all such variations and modifications as fall within the scope of the appended claims and equivalents thereof.

What is claimed is:

1. A mobile soil working device comprising
a machine frame (23),
a drive comprising a pushrod (5),
a guide element (4) movably guided at the machine frame (23), the guide element being provided for at least one penetration tool (3) adapted to be driven into the soil and to be pulled therefrom,
a tool holder (2) for the penetration tool (3), which tool holder is supported about a first pivot axis (40) in the guide element (4) movable up and down by the drive via the pushrod (5), such that the penetration tool (3) can be pivoted against a spring force while in the soil,
wherein
the pushrod (5', 5") is compressible against a spring force, it being possible for the at least one penetration tool (3) to penetrate into the soil, given a normal soil resistance, and for the penetration tool (3) to deflect, when the soil resistance is substantially higher than a normal soil resistance, and
the drive is adapted for up and down movement, and between the tool holder and the guide element a torsion element is provided coaxially with the first pivot axis, which torsion element, under a force effect on the at least one penetration tool, allows the tool holder to pivot relative to the guide element and, when the force effect ceases, exerts a restoring moment on the tool holder so that the penetration tool pivots back to a home position after having been pulled from the soil.

2. The soil working device of claim 1, wherein a spring element (50) generates the spring force, the spring element (50) being formed by a helical or coil-shaped compression or tension spring or by an elastomere/metal composite or an elastomere.

3. The soil working device of claim 1, wherein the torsion element is formed by at least one elastomeric element or an elastomere/metal composite element (1a, 1b), whose one axial end is connected with the guide element (4) in a torque-proof manner, and whose other axial end is connected with the tool holder (2) in a torque-proof manner.

4. The soil working device of claim 1, wherein the torsion element is a coil-shaped or helical metal torsion spring (1c).

5. The soil working device of claim 1, wherein the torsion element is a helical or coil-shaped metal torsion spring surrounded by elastomere.

6. The soil working device of one of claim 1, wherein the guide element (4) is guided along a guide (11) fastened to the machine frame (23).

7. The soil working device of claim 6, wherein the angle of the guide (11) is adjustable in a vertical plane extending in the travelling direction in order to set a penetration angle of the penetration tools (3).

8. The soil working device of claim 7, wherein the guide is linear and the angle of the linear guide (11) is centrally adjustable with respect to the machine frame (23) in order to set a penetration angle.

9. The soil working device of claim 1, wherein at least two rows (18, 19) of penetration tools or sets of penetration tools are arranged one behind the other in the travelling direction.

10. The soil working device of claim 1, wherein the guide element (4) is a support arm pivotally fastened in a second pivot bearing (22) at the machine frame (23).

11. The soil working device of claim 1, wherein a plurality of penetration tools (3) or a plurality of sets of penetration tools (3) are arranged side by side.

12. The soil working machine of claim 11, wherein the penetration tools (3) or sets of penetration tools (3) arranged side by side may be driven in a phase-shifted manner.

13. The soil working device of claim 1, wherein a central adjustment means for the penetration angle of the penetration tools (3) is provided, comprising at least one centrally adjustable stop (24), said at least one stop (24) being mounted to the machine frame (23) and limiting the movement of the penetration tools (3) back to the home position, caused by the restoring moment.

14. The soil working device of claim 13, wherein at least one link arm (25) is pivotally supported at the tool holder (2), which is in direct contact with the stop (24) prior to penetration of the soil, and whose end remote from the tool holder (2) is pivotally supported at an intermediate element (26) which in turn is pivotally supported at the machine frame (23).

15. The soil working device of claim 1, wherein the height of a stroke performed by the guide element (4) is adjustable.

16. The soil working device of one of claim 1, wherein the guide element (4', 4") is of bipartite structure and is comprised of an upper guide element (4') and a lower guide element (4"), the upper guide element (4') being coupled to the drive (17) and the lower guide element (4") supporting the tool holder (2), wherein at least one compression spring (21) is arranged between the upper and the lower guide element (4', 4"), which allows the at least one penetration tool (3) to penetrate into the soil, given a normal soil resistance, and allows the penetration tool (3) to deflect, when the soil resistance is substantially higher than a normal soil resistance.

17. The soil working device of claim 1, wherein the torsion element comprises at least two magnetic elements (60, 65), the at least two magnetic elements (60, 65) being oriented such relative to each other that they allow the tool holder (2) to pivot about the first pivot axis (40) and that they exert a magnetic restoring moment on the tool holder when the engagement with the soil has ended, so that the penetration tool (3) pivots back to the home position after having been pulled from the soil.

18. The soil working device of claim 17, wherein the magnetic elements are permanent magnets or solenoids.

* * * * *